United States Patent
Blake et al.

(10) Patent No.: US 12,082,556 B2
(45) Date of Patent: Sep. 10, 2024

(54) DOG BALANCE PLATFORM

(71) Applicant: Blue-9, LLC, Maquoketa, IA (US)

(72) Inventors: David R. Blake, Maquoketa, IA (US); Jamie Jerusa Popper, Maquoketa, IA (US)

(73) Assignee: Blue-9, LLC, Maquoketa, IA (US)

( * ) Notice: Subject to any disclaimer, the term of this patent is extended or adjusted under 35 U.S.C. 154(b) by 36 days.

(21) Appl. No.: 17/589,062

(22) Filed: Jan. 31, 2022

(65) Prior Publication Data

US 2022/0256809 A1     Aug. 18, 2022

Related U.S. Application Data

(60) Provisional application No. 63/150,618, filed on Feb. 18, 2021.

(51) Int. Cl.
*A01K 15/02* (2006.01)

(52) U.S. Cl.
CPC .................. *A01K 15/027* (2013.01)

(58) Field of Classification Search
CPC .... A01K 15/027; A01K 1/0157; A01K 1/027; A01K 1/0353
USPC .......................................................... 119/702
See application file for complete search history.

(56) References Cited

U.S. PATENT DOCUMENTS

| | | | | |
|---|---|---|---|---|
| 67,039 A * | 7/1867 | Golding | ................... | B63C 9/28 441/128 |
| 2,986,751 A * | 6/1961 | Baren | ...................... | B63B 7/08 441/66 |
| 3,781,931 A | 1/1974 | Knickerbocker | | |
| D275,302 S | 8/1984 | Rotella | | |
| 4,968,278 A * | 11/1990 | Lemke | .................... | B63B 35/00 D12/316 |
| 5,066,000 A * | 11/1991 | Dolan | ................ | A63B 23/0464 472/92 |
| 5,101,752 A * | 4/1992 | Smollar | .................. | B63B 32/20 114/345 |
| D337,362 S | 7/1993 | Goldstein | | |
| D339,179 S | 9/1993 | Wilkinson | | |

(Continued)

FOREIGN PATENT DOCUMENTS

GB     2568472 A     5/2019

OTHER PUBLICATIONS

Blue-9 Propel Air Platform Kit, posted at amazon.com, earliest date available Oct. 1, 2021, (online), acquired on Feb. 23, 2023, available on Internet. url: https://www.amazon.com/Blue-9-Conditioning-Equipment-Accessories-Professionally/dp/B09HR33YFZ?1.

*Primary Examiner* — Timothy D Collins
*Assistant Examiner* — Maria E Graber
(74) *Attorney, Agent, or Firm* — Woodard, Emhardt, Henry, Reeves & Wagner, LLP

(57) ABSTRACT

Inflatable balance equipment for training dogs that includes an inflatable pad in the general shape of a right rectangular prism with rounded edges and with an indentation in each of two opposite sides with each indentation spanning a height of the side it is in, and two handles unitarily using the same material as the inflatable pad with one handle positioned in each of the indentations. The inflatable pad can also include markings along either or both of the longitudinal or horizontal axis of the pad that can be used by a trainer to position the dog on the pad. A connecting device can be used to connect multiple pads together at the handles to create an array of pads.

22 Claims, 16 Drawing Sheets

(56) References Cited

U.S. PATENT DOCUMENTS

| | | | |
|---|---|---|---|
| 5,290,210 A | 3/1994 | Hand | |
| D353,636 S | 12/1994 | Le Roux | |
| 5,441,466 A | 8/1995 | Plaget | |
| 5,507,674 A * | 4/1996 | Yeung | B63B 34/52 441/131 |
| 5,853,309 A * | 12/1998 | Biggs | B63B 21/04 114/294 |
| 6,053,790 A * | 4/2000 | Langford | B63B 35/58 114/248 |
| 6,171,160 B1 * | 1/2001 | Skaggs | B63B 22/24 441/136 |
| 7,331,074 B2 * | 2/2008 | Wu | A47C 17/045 5/723 |
| 7,462,142 B1 * | 12/2008 | Gordon | A63B 21/4037 482/142 |
| 7,793,618 B2 * | 9/2010 | Edwards | A01K 15/026 119/702 |
| 8,052,587 B1 | 11/2011 | Wu | |
| 8,096,008 B1 * | 1/2012 | Phillips | A61G 1/013 128/870 |
| 8,360,943 B2 | 1/2013 | Smith | |
| D680,599 S * | 4/2013 | Orenstein | D21/671 |
| D681,138 S * | 4/2013 | Hodgkins | D21/686 |
| D740,500 S * | 10/2015 | Wickens | D30/160 |
| D746,934 S * | 1/2016 | Hsu | D21/803 |
| D747,425 S * | 1/2016 | Hsu | D21/803 |
| 9,241,580 B2 * | 1/2016 | Patrick | A61G 7/1028 |
| 9,376,777 B2 * | 6/2016 | Peterson | B63B 34/52 |
| 9,724,586 B2 | 8/2017 | Smith | |
| D800,973 S | 10/2017 | Jakubowski | |
| D804,590 S * | 12/2017 | Hillson | D21/671 |
| D824,114 S | 7/2018 | Couse | |
| D824,115 S | 7/2018 | Couse | |
| D824,116 S | 7/2018 | Couse | |
| D824,117 S | 7/2018 | Couse | |
| D834,768 S | 11/2018 | Sarver | |
| D861,994 S | 10/2019 | MacNeil | |
| D864,493 S | 10/2019 | MacNeil | |
| D894,504 S | 8/2020 | Ryan | |
| D930,285 S | 9/2021 | Sarver | |
| 11,266,551 B2 * | 3/2022 | Davis | A61G 7/1021 |
| D968,729 S | 11/2022 | Chen | |
| D969,242 S | 11/2022 | Ehrenreich | |
| D978,446 S * | 2/2023 | Wendling | D30/121 |
| 2005/0049123 A1 * | 3/2005 | Dalebout | A63B 21/0552 482/142 |
| 2005/0081299 A1 * | 4/2005 | Torres | A47C 27/081 5/710 |
| 2005/0170935 A1 * | 8/2005 | Manser | A63B 26/003 482/54 |
| 2012/0202652 A1 | 8/2012 | Ross | |
| 2012/0208678 A1 * | 8/2012 | Knilans | A63B 23/0458 482/52 |
| 2014/0302973 A1 * | 10/2014 | Fitterer | A63B 23/0464 482/142 |
| 2016/0272285 A1 * | 9/2016 | Ackerman | A01K 29/00 |
| 2017/0043199 A1 | 2/2017 | Lin | |
| 2018/0064252 A1 * | 3/2018 | Chin | A47C 7/021 |
| 2019/0045747 A1 * | 2/2019 | Torraca | A01K 15/027 |

* cited by examiner

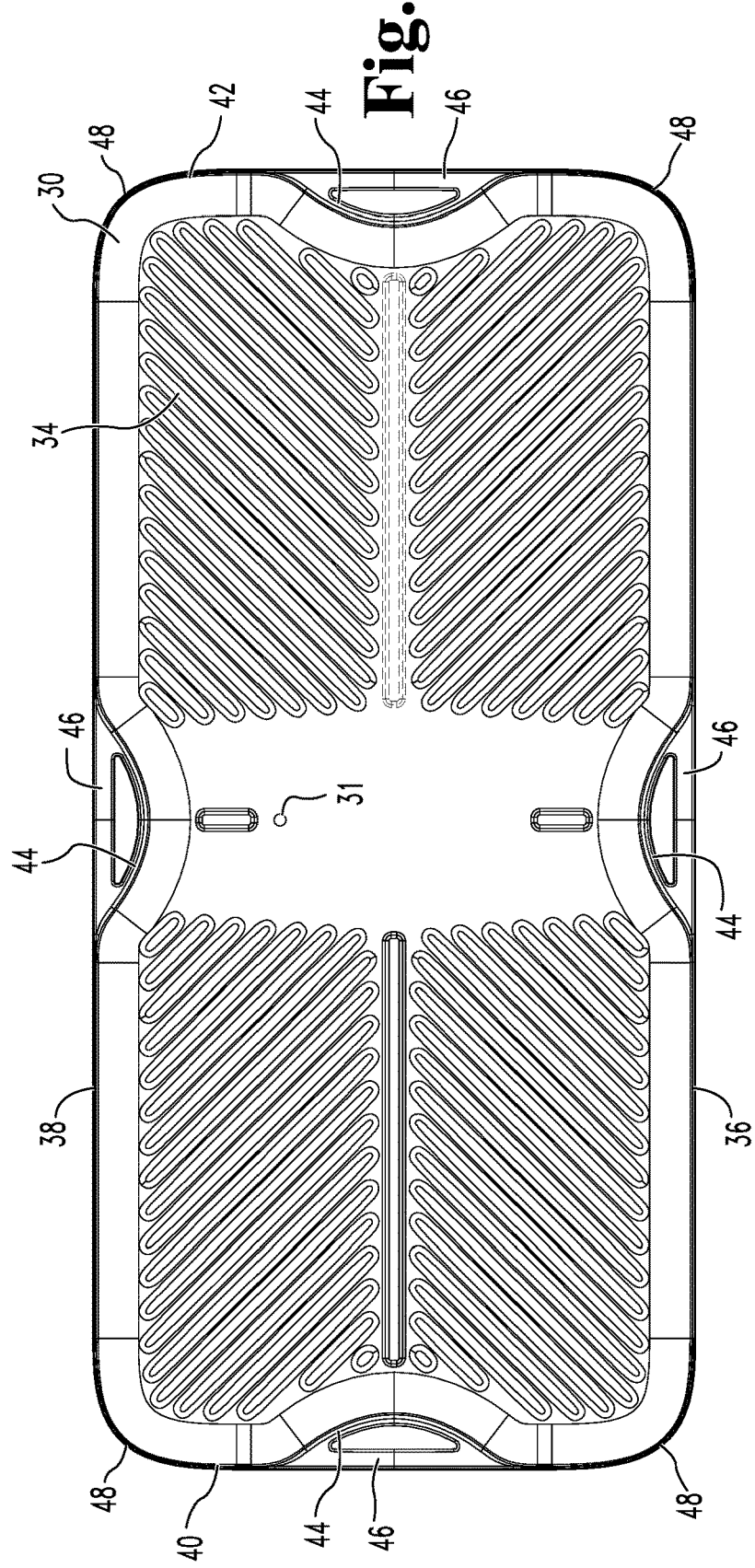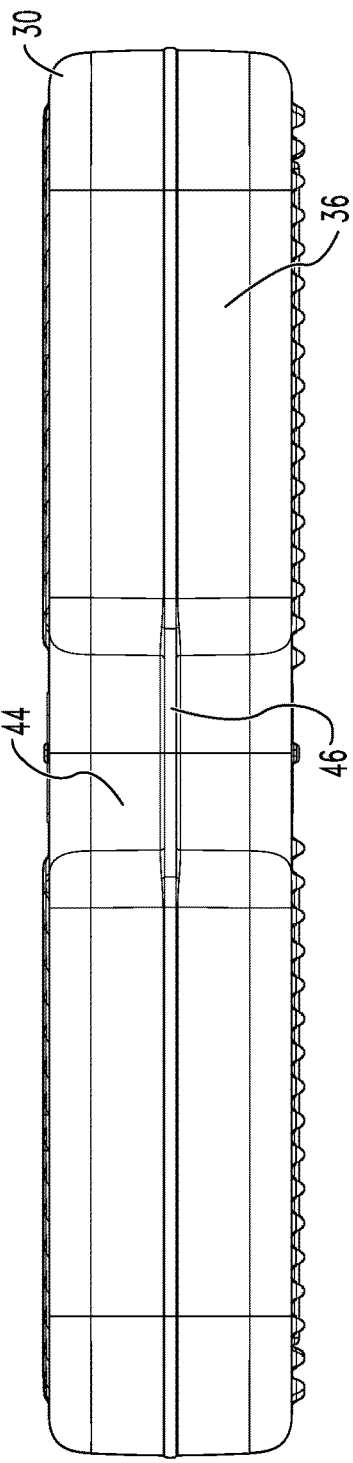

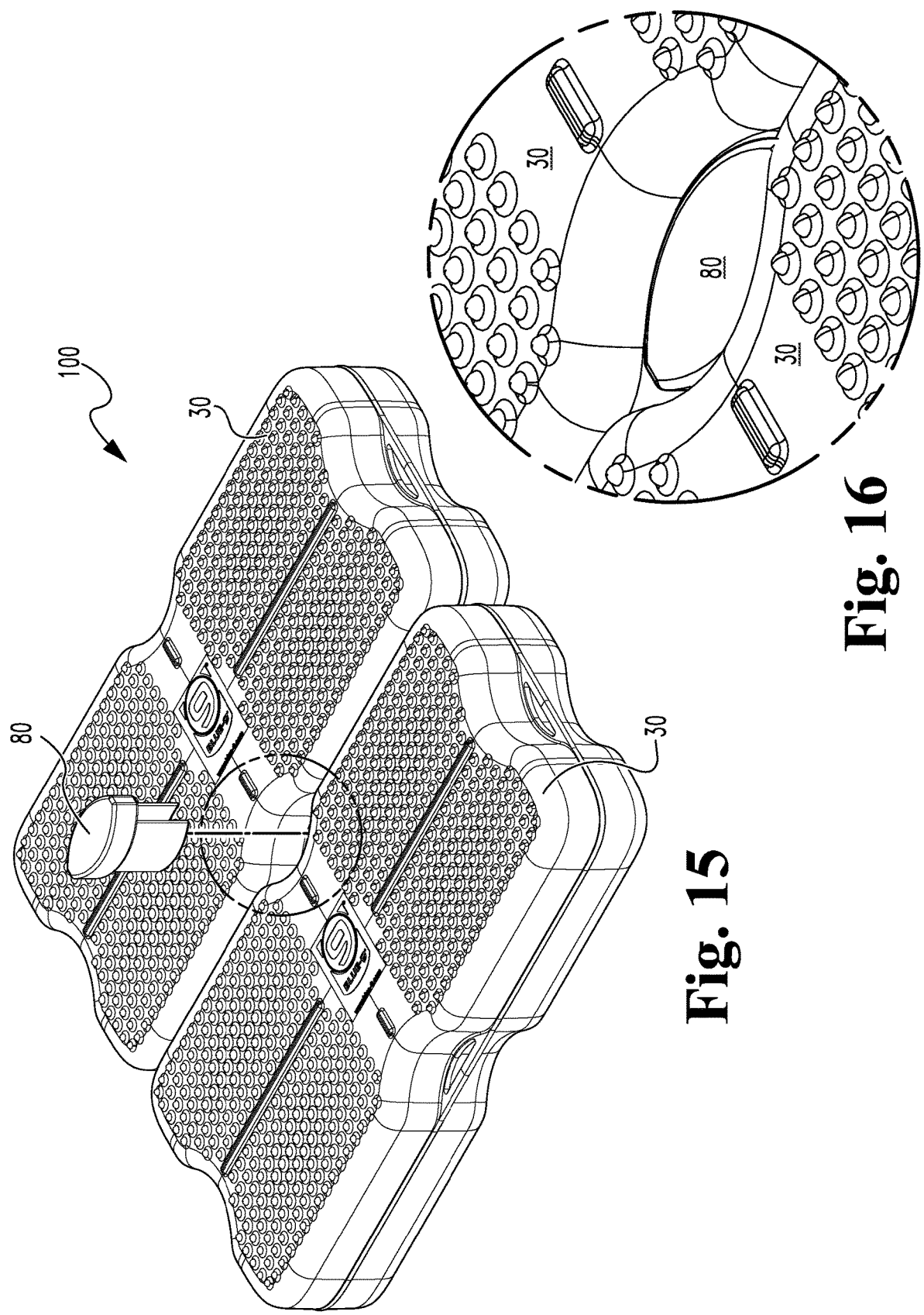

DOG BALANCE PLATFORM

CROSS-REFERENCE TO RELATED APPLICATIONS

This application claims the benefit of U.S. Provisional Application No. 63/150,618, filed Feb. 18, 2021, which is hereby incorporated by reference.

BACKGROUND

The present disclosure pertains generally to a balance-training platform for dogs or other quadrupeds that can be used for training balance, agility, proprioception and injury rehabilitation.

The disclosed platform can be used during the rehabilitation of dogs following injury or surgery and can also be used to train dogs for athletic activities that require the dog to be athletically fit. Balance and stability are important for many aspects of healthy dogs. Training balance and stability can be used with puppies to help development of skills and older dogs that have weakness due to age that result in reduced strength and stability. One of the goals of the disclosed platform is to provide a training device that can be used to improve functional strength and mobility by encouraging weight shifts and muscle use and to enhance proprioceptive feedback to improve balance and stability.

Existing equipment does not adequately address all of the needs of trainers who are training or rehabilitating dogs. The disclosed equipment addresses some of the limitations of prior art balance equipment for dogs.

SUMMARY

The present disclosure pertains generally to an inflatable balance pad platform for dogs or other quadrupeds that can be used for training balance, agility, proprioception and injury or surgery rehabilitation.

BRIEF DESCRIPTION OF THE DRAWINGS

FIG. 7 is a bottom plan view of the FIG. 1 pad.
FIG. 8 is a front elevational view of the FIG. 1 pad.
FIG. 15 is an assembly view of an array of FIG. 1 pads being connect with the FIG. 9 connector
FIG. 16 is a view of the FIG. 9 connector installed between adjacent FIG. 1 pads.

DESCRIPTION OF THE SELECTED EMBODIMENTS

Figure 1:
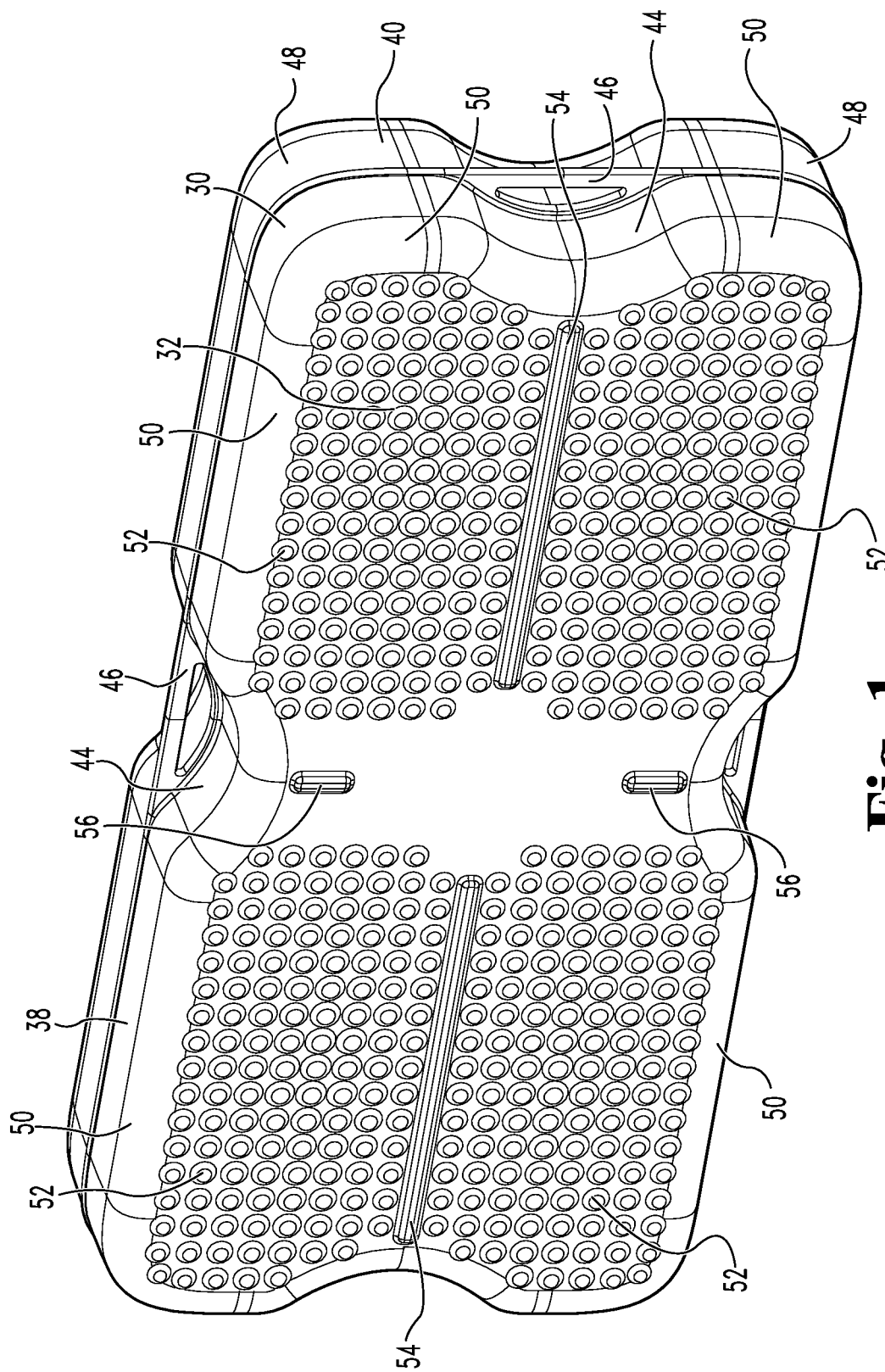
FIG. 1 is top perspective view of a balance pad.
Figure 2:
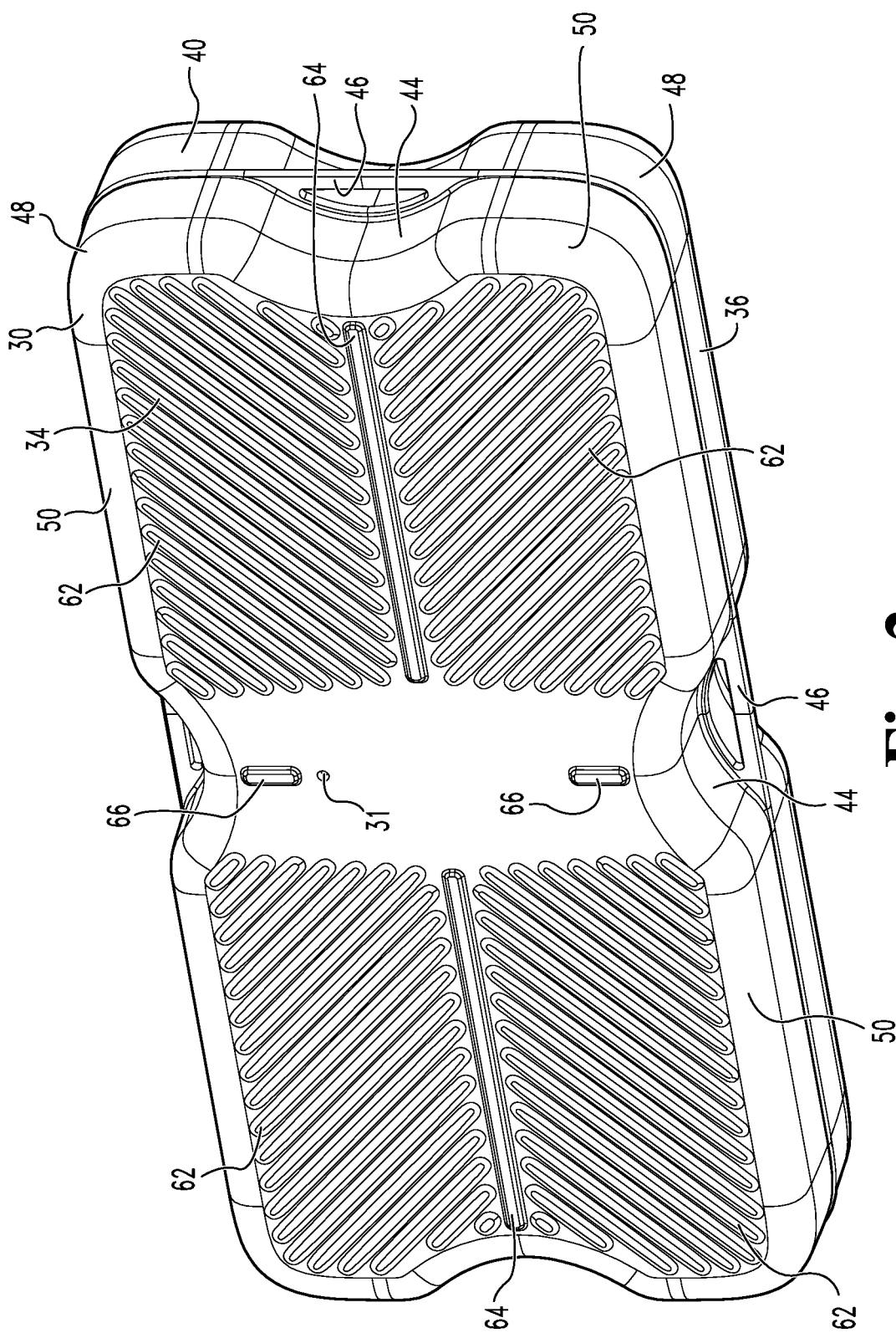
FIG. 2 is a bottom perspective view of the FIG. 1 pad.
Figure 3:
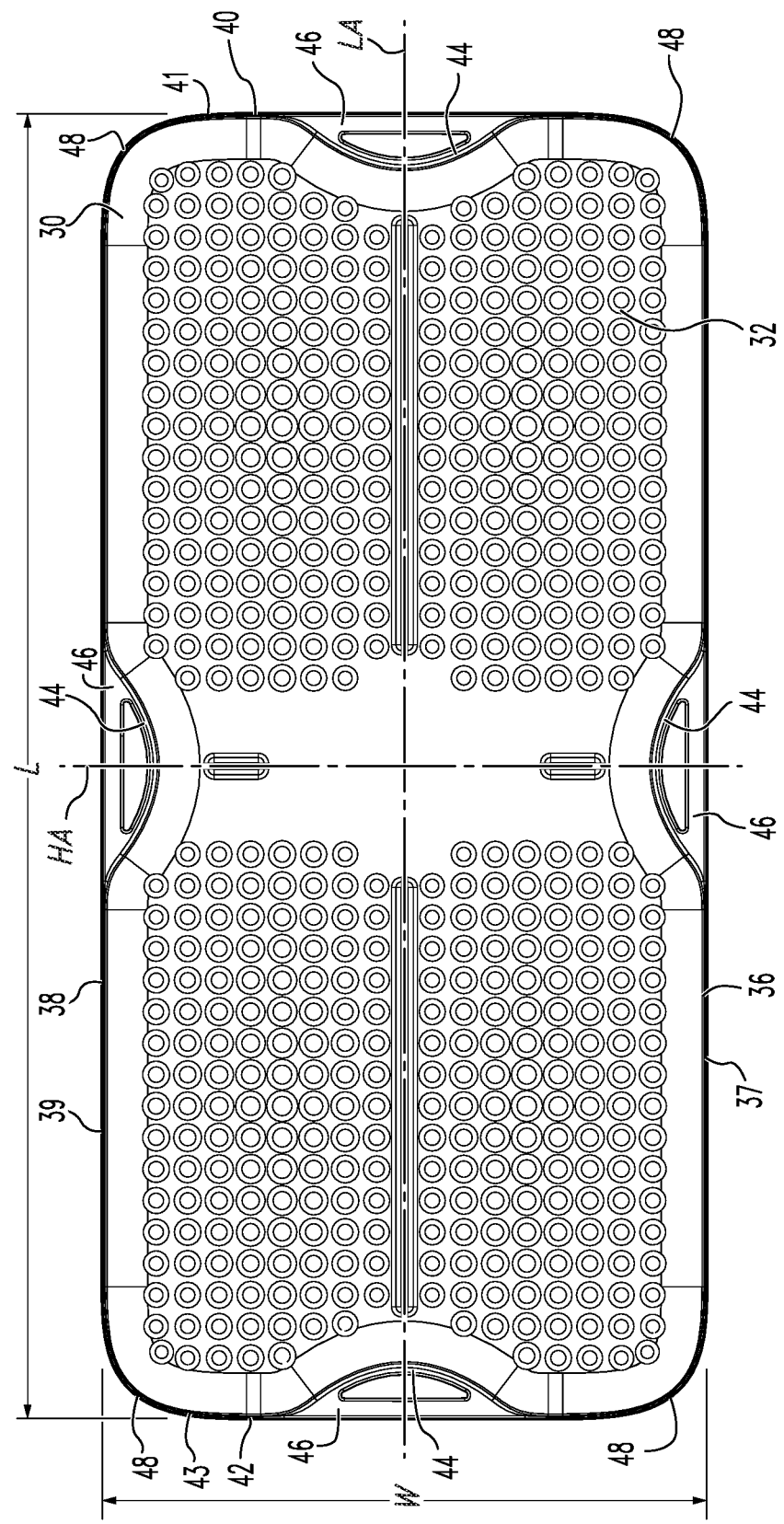
FIG. 3 is a top plan view of the FIG. 1 pad.
Figure 4:
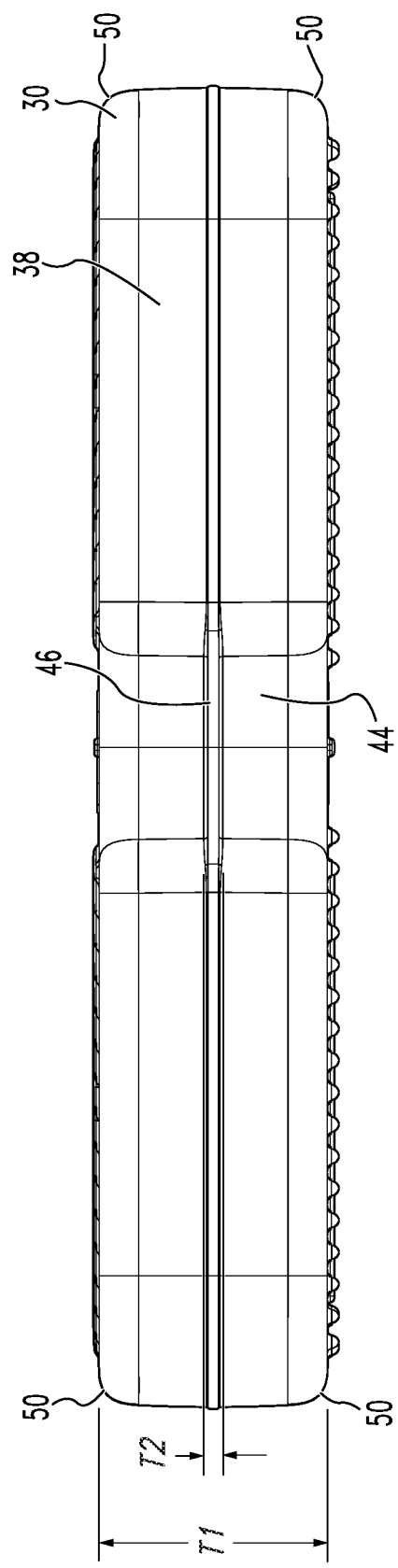
FIG. 4 is a rear elevational view of the FIG. 1 pad.
Figure 5:
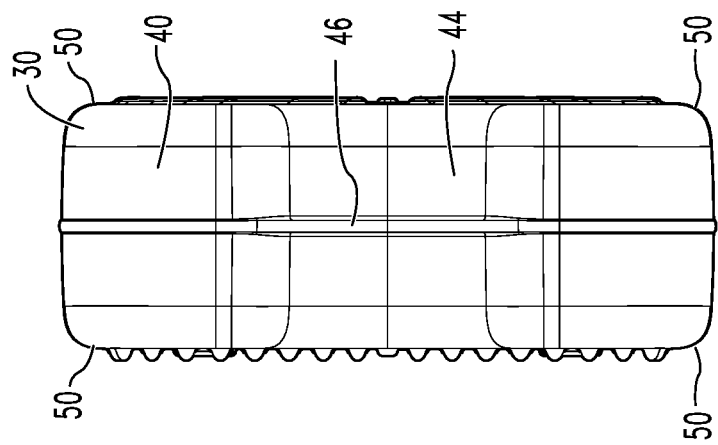
FIG. 5 is a right elevational view of the FIG. 1 pad.
Figure 6:
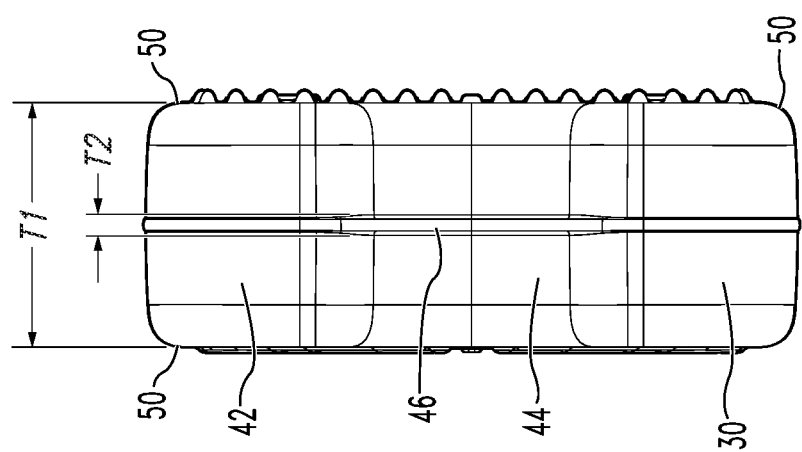
FIG. 6 is a left elevational view of the FIG. 1 pad.
Figure 10:
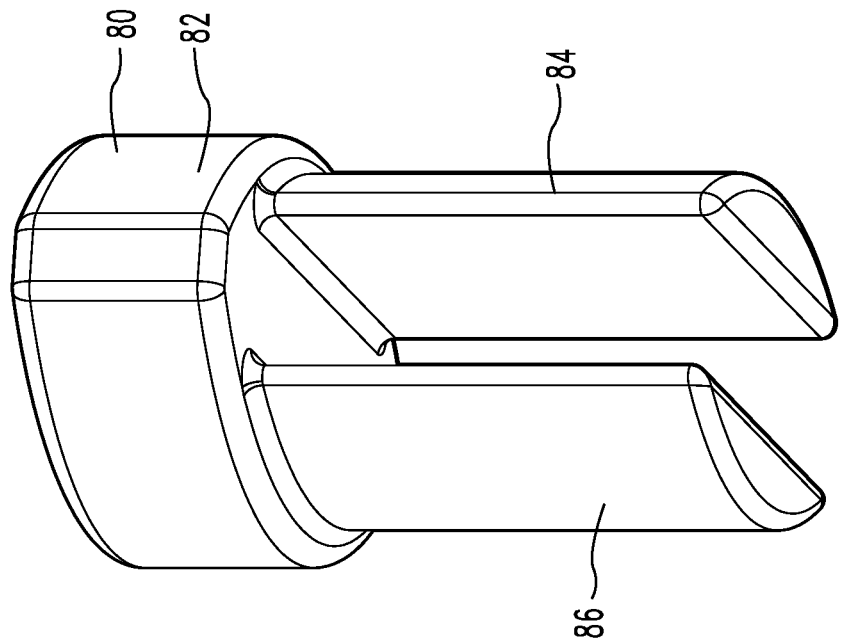
FIG. 10 is a bottom perspective view of the FIG. 9 connector.
Figure 9:
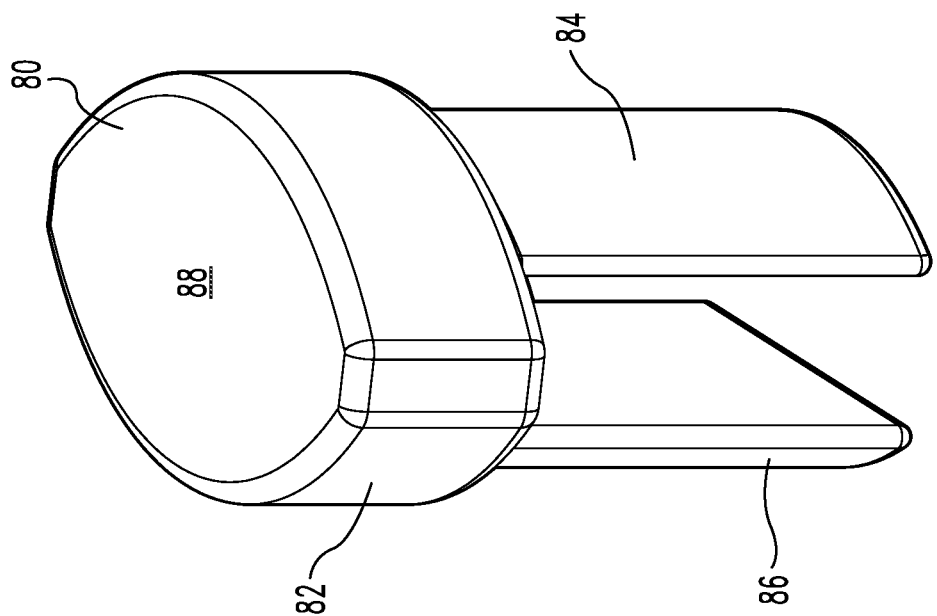
FIG. 9 is a top perspective view of a connector.
Figure 11:
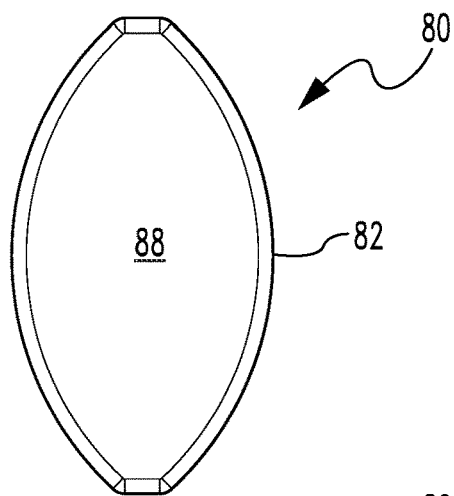
FIG. 11 is a top plan view of the FIG. 9 connector.
Figure 12:
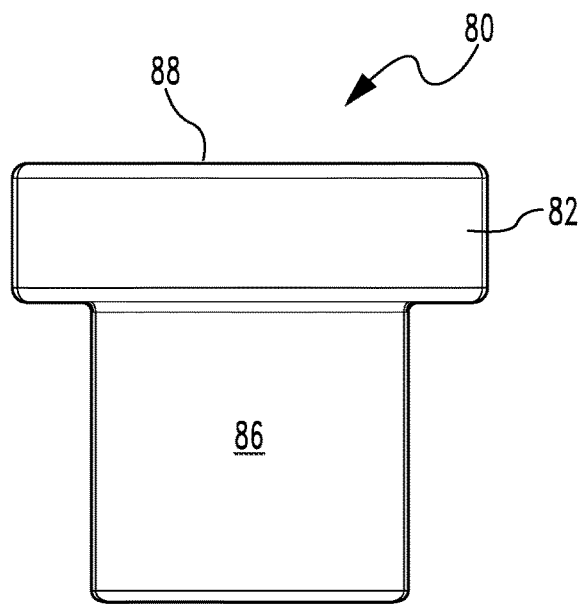
FIG. 12 is a front elevational view of the FIG. 9 connector.
Figure 13:
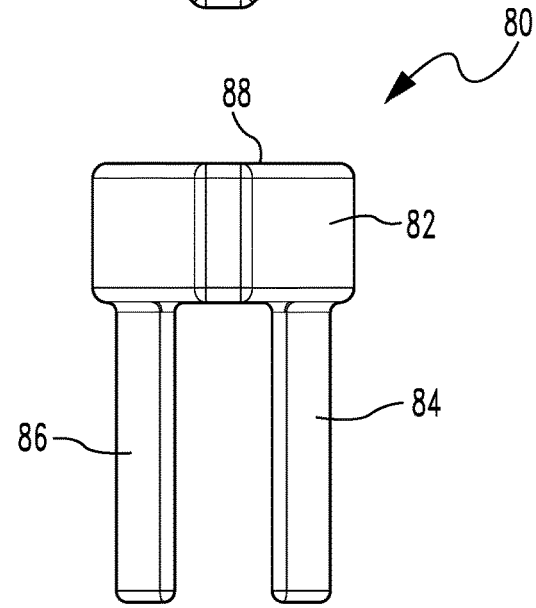
FIG. 13 is a right side elevational view of the FIG. 9 connector.
Figure 14:
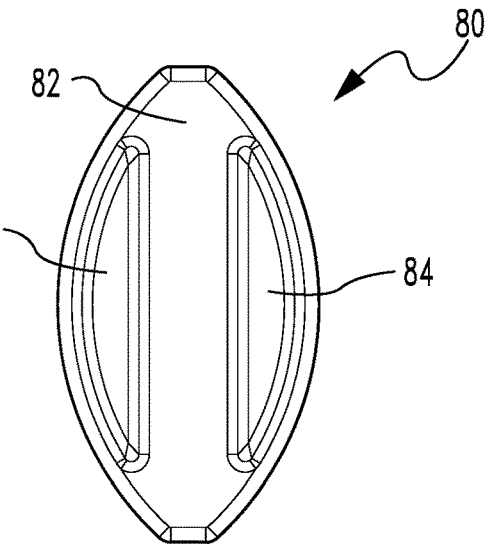
FIG. 14 is a bottom plan view of the FIG. 9 connector.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail, although it will be apparent to those skilled in the relevant art that some features that are not relevant to the present claimed invention may not be shown for the sake of clarity.

With respect to the specification and claims, it should be noted that the singular forms "a", "an", "the", and the like include plural referents unless expressly discussed otherwise. As an illustration, references to "a device" or "the device" include one or more of such devices and equivalents thereof. It also should be noted that directional terms, such as "left", "right", "up", "down", "top", "bottom", and the like, are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

The inflatable balance pad disclosed below operates to train a dog standing on it by encouraging equal distribution of weight between paired paws, either two paws or four paws. As disclosed below, multiple pads can be coupled together to form a larger array to accommodate larger dogs and/or activities requiring the dog to take steps on the pad(s). The disclosed balance pad can be used for standing and holding activities and can also be used with functional movement activities.

Referring to FIGS. 1-8, pad 30 is illustrated. Pad 30 defines the general shape of a right rectangular prism with rounded edges. Pad 30 includes balance surfaces 32 and 34, front surface 36, back surface 38, right side surface 40 and left side surface 42. Balance surfaces 32 and 34 are optionally the two largest surfaces of pad 30. Balance surfaces 32 and 34 are optionally opposite each other on pad 30. Pad 30 has a length L, a width W and a thickness T1. The illustrated embodiment has a length L of approximately 24″ (61 cm), a width W of approximately 12″ (30 cm) and a thickness T1 of approximately 4½″ (11 cm). The length L of the illustrated embodiment is approximately twice width W. Pad 30 defines a longitudinal axis LA and a horizontal axis HA. Pad 30 includes valve 31 that can be used to selectively inflate or deflate pad 30.

Front surface 36 defines a plane 37 that extends along the major surface of front surface 36. Back surface 38 defines plane 39 that extends across the major surface of back surface 38. Right side surface 40 defines plane 41 that extends along the major surface of right side surface 40. Left side surface 42 defines plane 43 that extends along the major surface of left side surface 43. Each of surfaces 36, 38, 40 and 42 define indentations 44 and handles 46 in each indentation 44. Each indentation 44 extends between balance surfaces 32 and 34.

Handles 46 do not extend outside of plane 37, 39, 41 or 43 of the respective surface 36, 38, 40 or 42 where individual handles 46 are positioned. Handles 46 have a thickness T2. Thickness T2 is less that thickness T1. Handles 46 may optionally be constructed from the same material as the rest of pad 30. Handles 46 may optionally be unitarily constructed from a single piece with the rest of pad 30.

In the illustrated embodiment, handles 46 are positioned substantially at the center of the respective surface 36, 38, 40 or 42 where individual handles 46 are positioned. In the illustrated embodiments, individual handles are positioned so that individual handles 46 are substantially symmetric about one of longitudinal axis LA or horizontal axis HA. However, in alternative embodiments (not illustrated), handles 46 could be positioned away from the center of the respective surface 36, 38, 40 or 42 and/or multiple handles could be positioned on a single respective surface 36, 38, 40 or While the illustrated pad 30 includes handles on each of the respective four side surface 36, 38, 40 and 42, it should be understood that alternative embodiment (not illustrated) could optionally include handles on less than all four side 36, 38, 40 and 42 or no handles at all.

Junctions between adjacent surfaces 36, 38, 40 and 42 define rounded corners 48. Junctions between balance surfaces 32 or 34 and adjacent surfaces 36, 38, 40 or 42 define rounded edges 50.

Pad 30 defines an internal chamber that is adapted to contain a volume of fluid, such as air, and is also adapted to be selectively sealable by valve 31. Pad 30 can be selectively inflated or deflated at different volumes including under inflated (not shown), fully inflated (as shown in FIGS. 1-8) and over inflated (not shown). When pad 30 is under inflated and when not otherwise deformed, surface 32 defines a concave shape. When pad 30 is fully inflated and when not otherwise deformed, surface 32 is substantially planar, as shown in FIGS. 1-8. When pad 30 is over inflated and not otherwise deformed, surface 32 defines a convex shape.

Pad 30 is constructed of a resilient material that deforms under the weight of a dog encouraging the dog to balance weight distribution between multiple paws to be balanced on the inflatable pad. The material is selected to be sufficiently durable to resist scratching and puncture by dog claws and teeth while also providing a somewhat grippy, non-slippery surface for dog paws.

Varying the inflation volume of pad 30 can be used to create different challenges for the dog being trained. Under inflating pad 30 makes the balance surfaces less firm, making it more difficult for the dog to bear weight evenly on multiple paws. Overinflating pad 30 makes the balance surface more firm, making it easier for the dog to bear weight evenly on multiple paw, but overinflated pad 30 may create a less stable base surface opposite the balance surface, which could create its own, different, balance training challenge for the dog.

Balance surface 32 includes an array of raised members 52, linear protrusions 54 and linear protrusions 56. Raised members 52 are adapted to provide improved traction to a dog standing on balance surface 32. Linear protrusions 54 extend along longitudinal axis LA, with balance surface 32 being substantially symmetric about linear protrusions 54. Linear protrusions 56 extend along horizontal axis HA, with balance surface 32 being substantially symmetric about linear protrusions 56. Linear protrusions 54 and 56 provide visible indicia that a trainer can use to help position the paws of a dog symmetrically on balance surface 32 which may aid the dog in balancing on pad 30.

Balance surface 34 includes an array of raised member 62, linear protrusions 64 and linear protrusions 66. Raised members 62 are adapted to provide improved traction to a dog standing on balance surface 34. Linear protrusions 64 extend along longitudinal axis LA, with balance surface 34 being substantially symmetric about linear protrusions 64. Linear protrusions 66 extend along horizontal axis HA, with balance surface 34 being substantially symmetric about linear protrusions 66. Linear protrusions 64 and 66 provide visible indicia that a trainer can use to help position the paws of a dog symmetrically on balance surface 34 which may aid the dog in balancing on pad 30. As shown in the FIGs, raised member 52 and 62 may be different. However, in other embodiments, not shown, raised members 52 and 62 may be similar or the same.

Referring to FIGS. 9-14, connector 80 is shown. Connector 80 generally defines body 82 with protrusions 84 and 86 extending from body 82. Protrusions 84 and 86 extend parallel to each other, space apart by gap G. Protrusions 84 and 86 are configured to fit snuggled through the opening between handle 46 and indentation 44. Gap G is configured to accommodate side by side handles 46 between protrusions 84 and 86. Body 82 also defines surface 88. Connector 80 is configured to connect one handle 46 on one pad 30 to an adjacent handle 46 on a second pad 30 to form an array of connected pad. Surface 88 may optionally be configured to be substantially flush with top surfaces of adjacent pads 30 when connector 80 is connecting the adjacent pads 30 together.

Referring to FIGS. 15 and 16, connector 80 is shown connecting a pair of pads 30 together to form pad array 100. Pads 30 are aligned so that handles 46 on each pad 30 are aligned. Connector 80 is inserted so that protrusions 84 and 86 each pass through one of the two adjacent handles. Body 82 may optionally be configured to at least partially fill the opening defined by aligned adjacent indentations 44, which positions surface 88 such that a dog could optionally stand on connector 80, if the dog were to step in the aligned indentations 44.

Note that there are many types of connectors that could be used to connect adjacent pads together, including, but not limited to, a tied length of string or rope, twisted wire, and a carabineer. It should also be noted that pad 30 can be connect to other items using handles 46.

Using a connector, such as connector 80, multiple pads can be connected together to form a larger array of pads to accommodate different training needs. For example, a large dog could require multiple pads to accommodate all 4 paws. In another example, an array of pads could be created to from a balance course for a dog to navigate.

Figure 17:
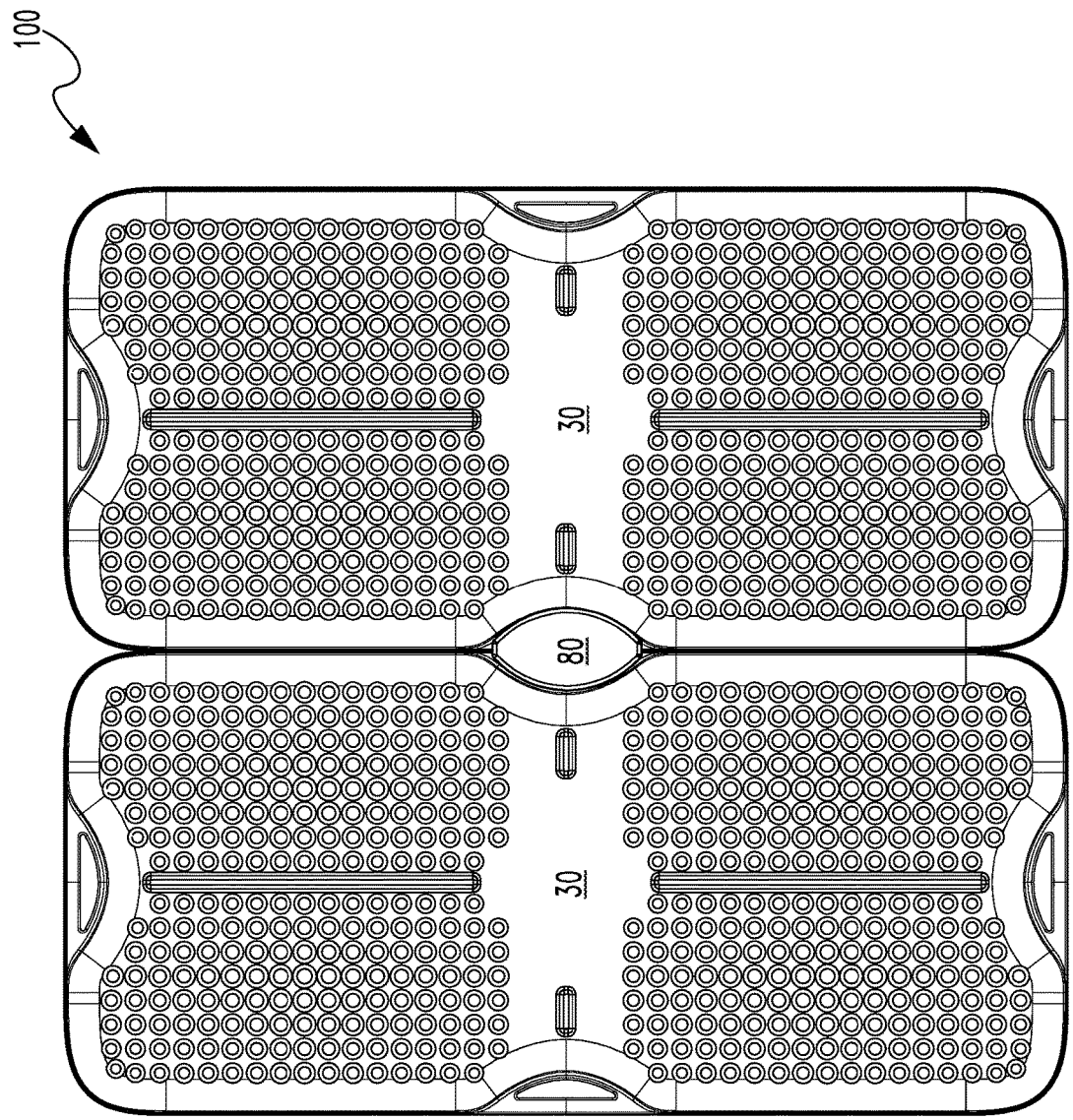
FIG. 17 is a top plan view of an array of FIG. 1 pads connected with the FIG. 9 connector.
Figure 18:
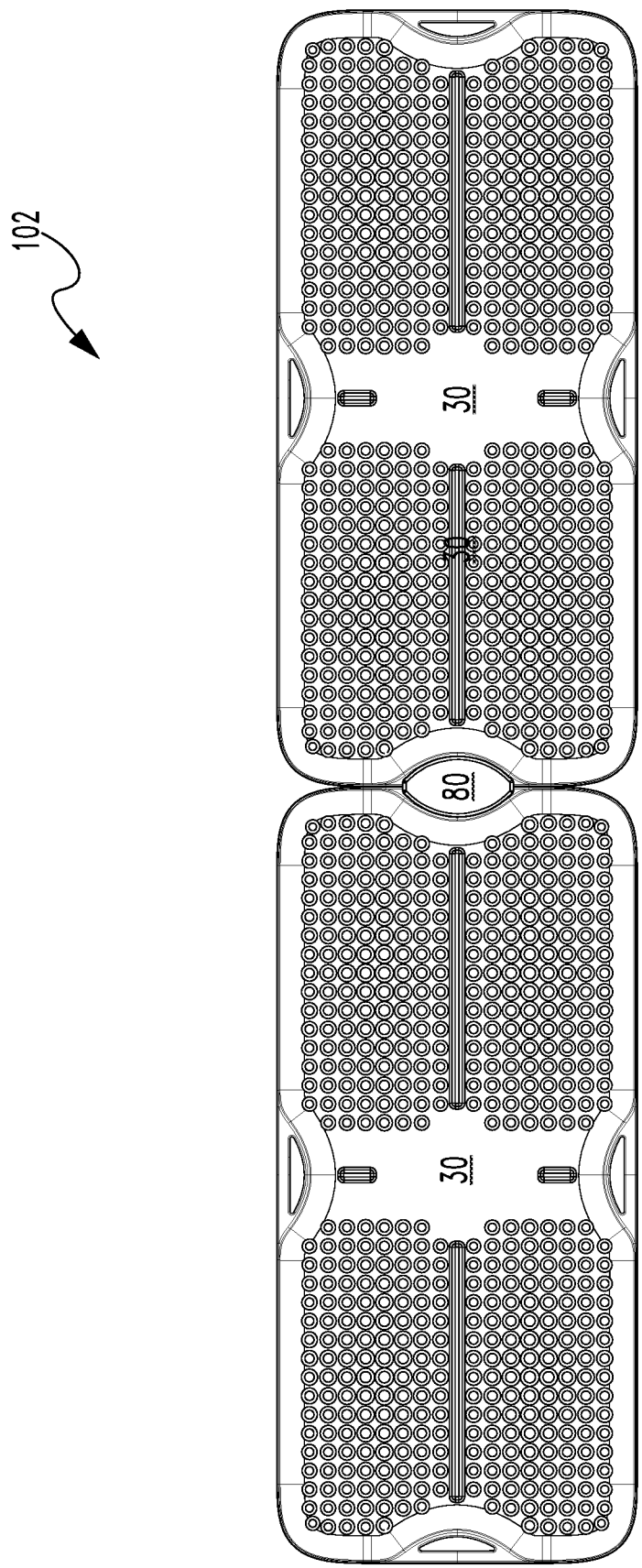
FIG. 18 is a top plan view of an alternative array of FIG. 1 pads connected with the FIG. 9 connector.
Figure 19:
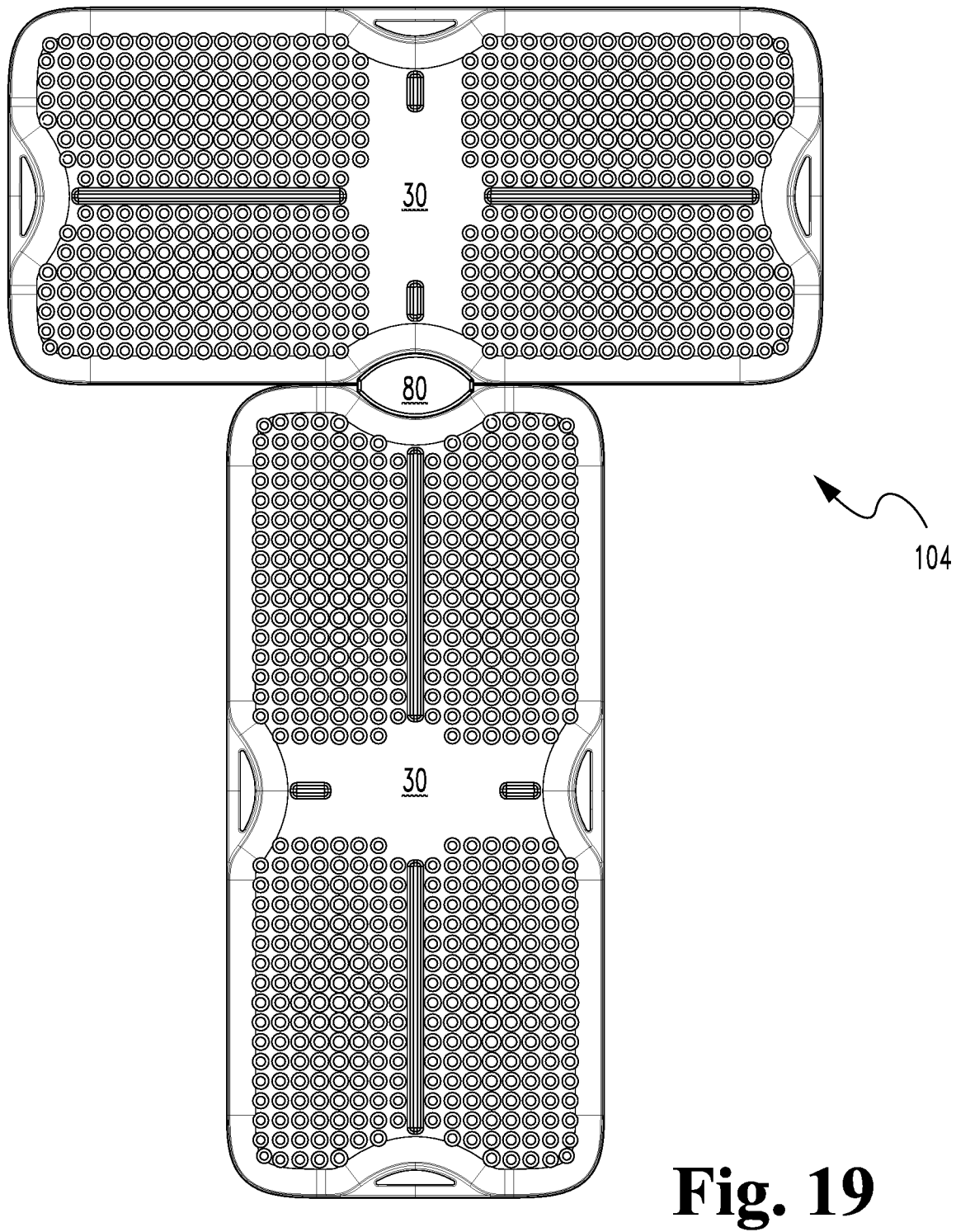
FIG. 19 is a top plan view of yet another alternative array of FIG. 1 pads connected with the FIG. 9 connector.
Figure 20:
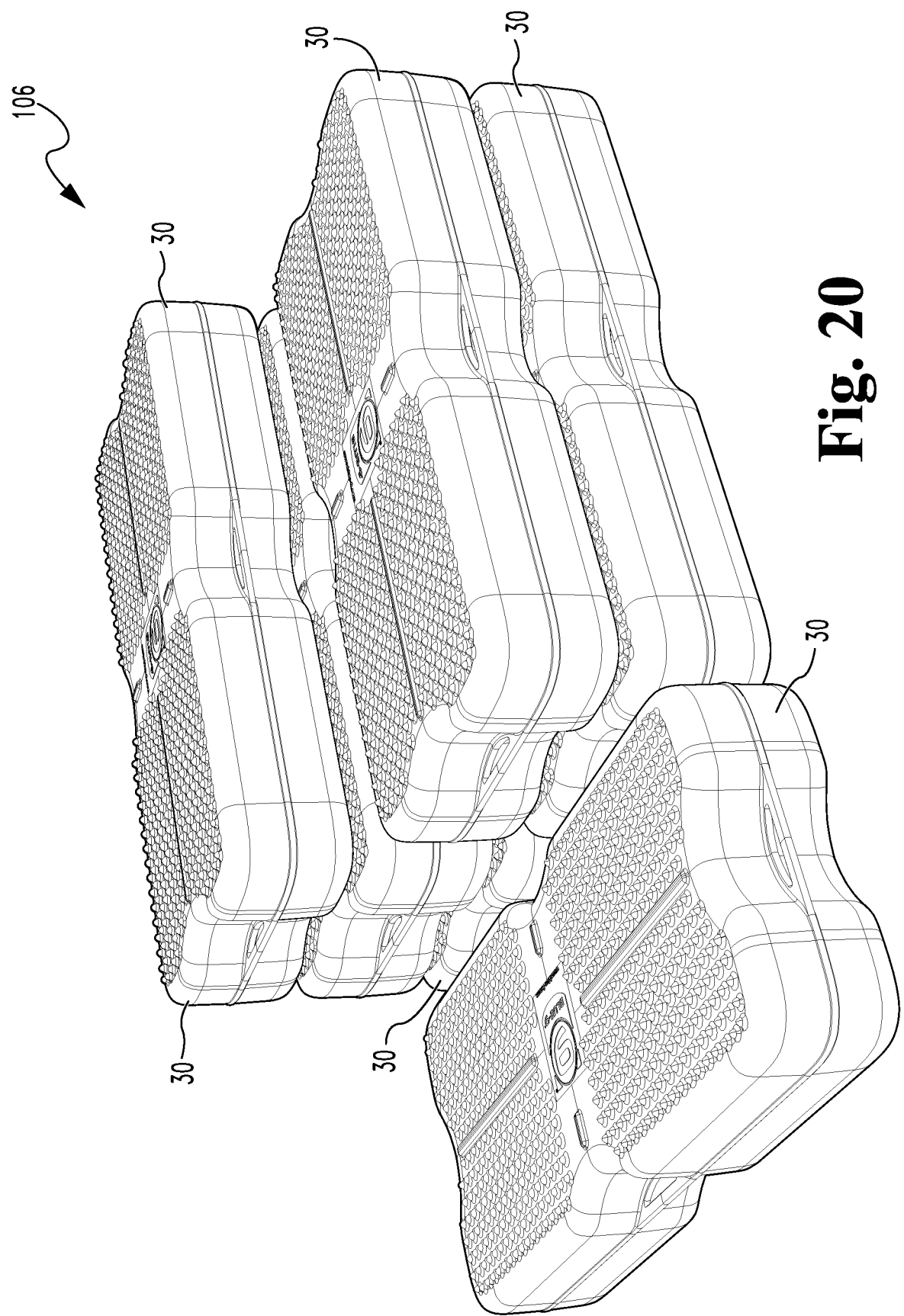
FIG. 20 is a perspective view of a stacked array of FIG. 1 pads.

Referring to FIG. 17, pad array 100 is illustrated with connector 80 connecting pads 30 together. Referring to FIG. 18, pad array 102 is illustrated with connector 80 connecting adjacent pads 30 together. Referring to FIG. 19, pad array 104 is illustrated with connector 80 connecting adjacent pads 30 together. Referring to FIG. 20, pad array 106 is illustrated with a plurality of pads 30 arranged and stacked together. While not shown, connectors can be used to connect adjacent handles together. Pad arrays 100, 102, 104 and 106 are non-limiting examples of different configurations of adjacent pads. Multiple pads can be connected to form larger arrays of pads. Pads can be arranged adjacent to each other or stacked on top of each other or a combination of adjacent and stacked. Stacking multiple pads on top of each other can create a more challenging situation for the dog to remain balanced and/or require the dog to climb up and down to increase the required effort to navigate an array of pads.

Figure 21:
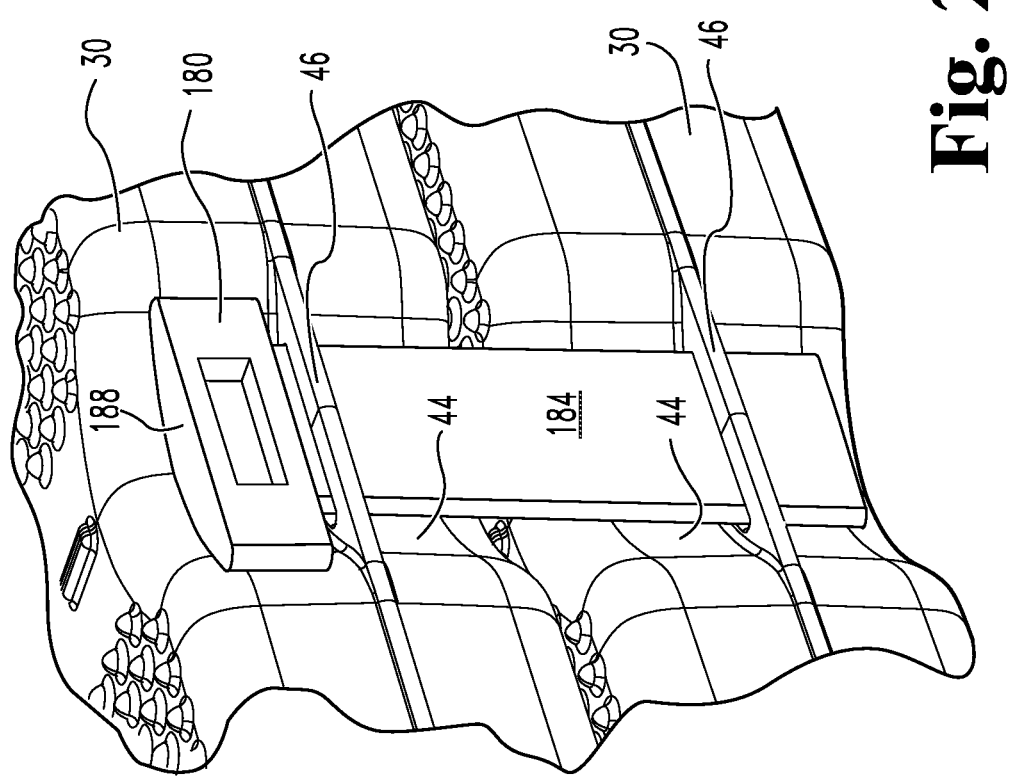
FIG. 21 is a perspective view of stacked FIG. 1 pads connected by a second embodiment of a connector.

Referring to FIG. 21, connector 180 is shown connecting stacked pads 30 together through aligned handles. Connector 180 includes protrusion 184 that extends through aligned opening between handle 46 and indentation 44 in the stacked pads. Connector 180 also includes surface 188. A plurality of connectors 180 may optionally be used to connect a pair of pads together by passing through multiple aligned openings between different handles 46 and indentations 44 in the stacked pads (not shown).

Figure 22:
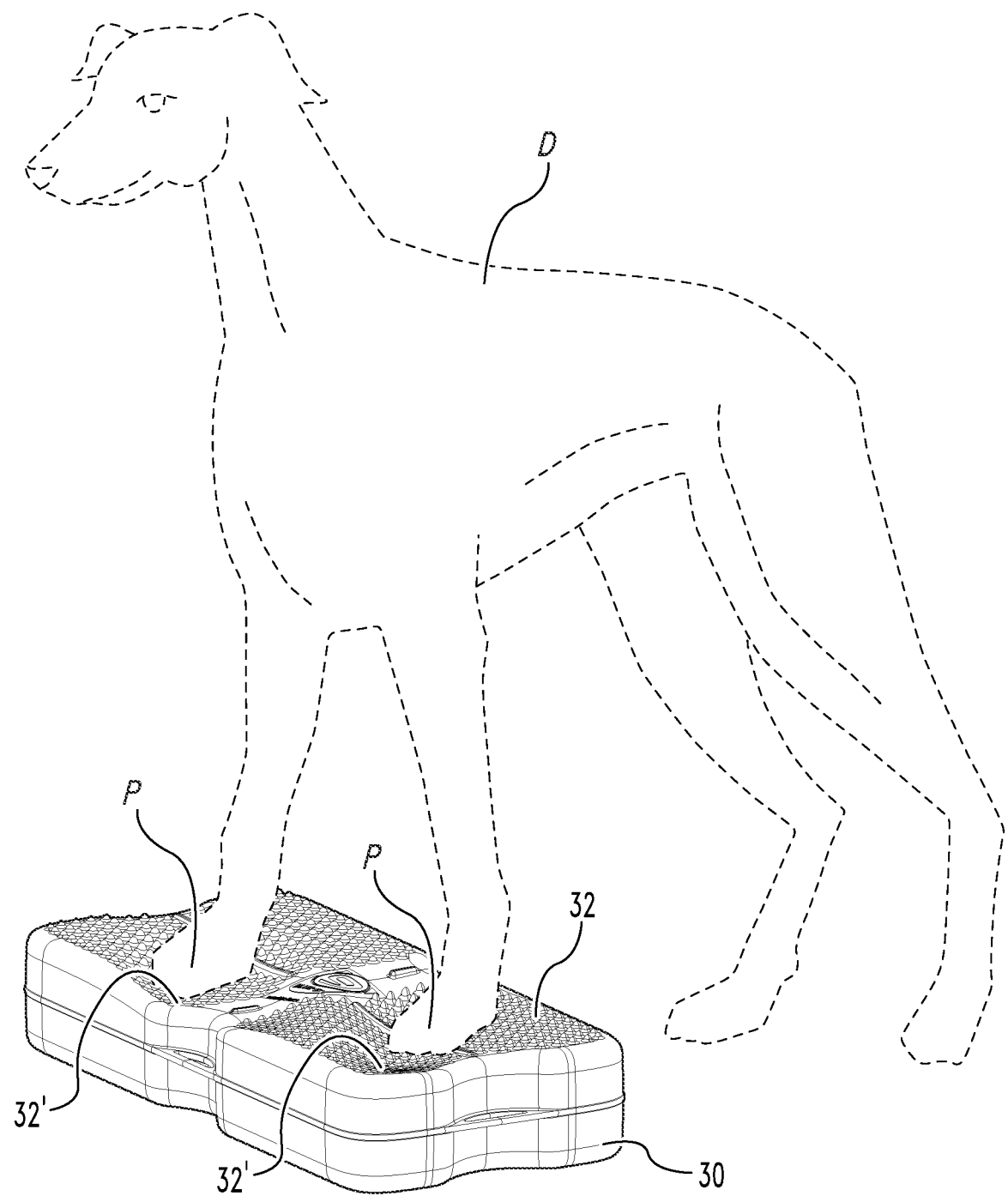
FIG. 22 is a perspective view of a dog standing on a FIG. 1 pad.

Referring to FIG. 22, pad 30 is shown being used with dog D. Dog D's front paws P are positioned on balance surface 32 of pad 30. At each point of contact between paws P and balance surface 32, balance surface 32 is deformed due to the resilient nature of inflated pad 30, defining indentations 32' in balance surface 32. FIG. 22 illustrated one way that pad 30 can be used with a dog to train balance. Note that paws P are not symmetrically aligned with balance surface 32 in the illustrated example.

Figure 23:
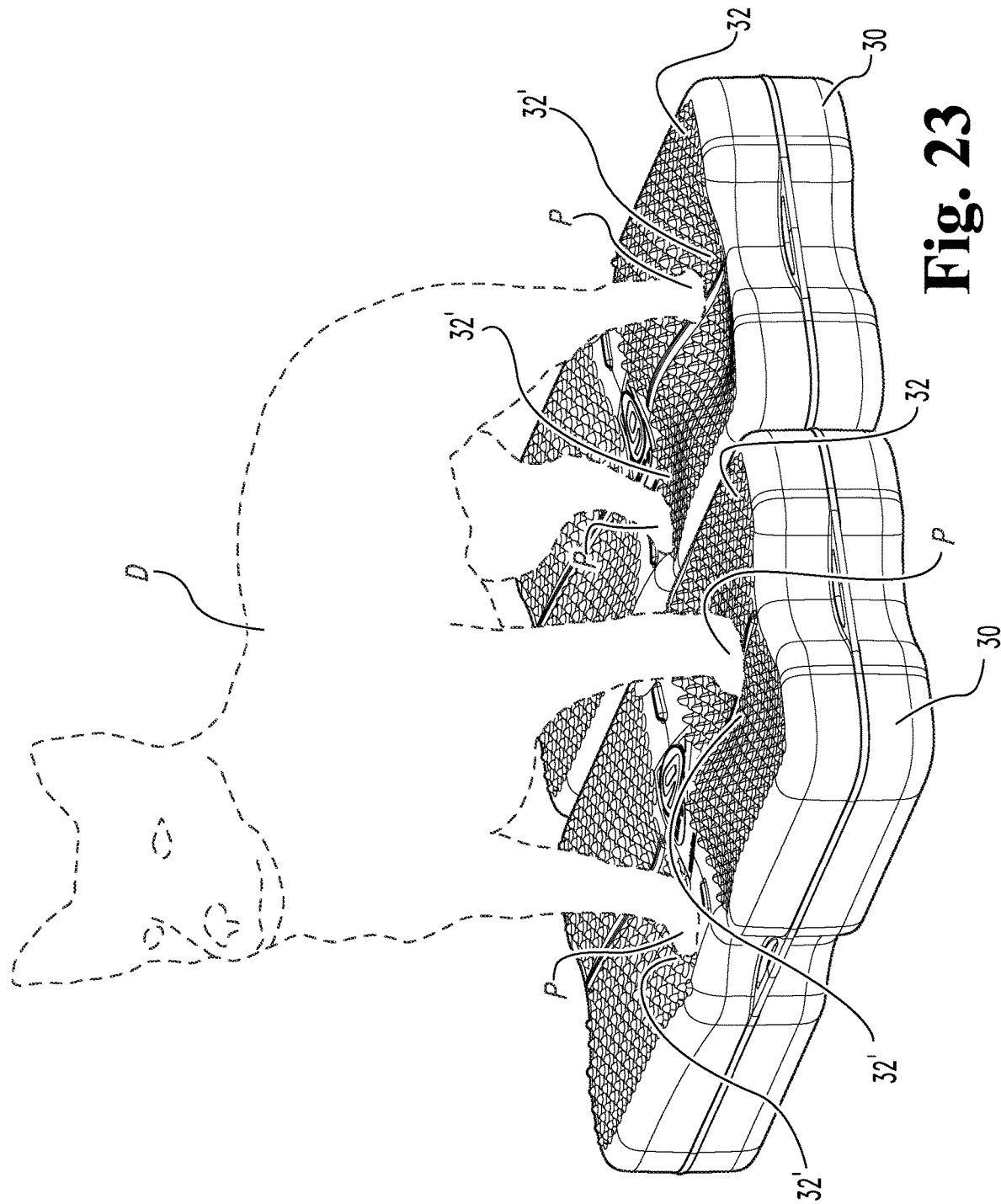
FIG. 23 is a perspective view of a dog standing on the FIG. 17 array of FIG. 1 pads.

Referring to FIG. 23, array 100 is shown being used with dog D, with all 4 paws P being positioned on the two balance surfaces 32 of pads 30. At each point of contact between paws P and balance surface 32, balance surface 32 is deformed due to the resilient nature of inflated pad 30, defining indentations 32' in balance surface 32. FIG. 23 illustrated another way that pads 30 can be used with a dog to train balance. Note that paws P are not symmetrically aligned with array 100 or balance surfaces 32 in the illustrated example.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

The invention claimed is:

1. Inflatable balance equipment adapted for use training dogs, the balance equipment comprising:
an inflatable pad in the general shape of a right rectangular prism having rounded edges and with an indentation in each of two opposite sides with each indentation spanning an entire height of the side it is in, wherein the inflatable pad has a width between the two opposite sides and wherein a distance between the indentations in each of the two opposite sides is smaller than the width between the two opposite sides, the inflatable pad comprising:
two handles unitarily formed out of the same material as the inflatable pad with one handle positioned in each of the indentations.

2. The inflatable balance equipment of claim 1, wherein the indentations and the handles are substantially at the center of the opposite sides.

3. The inflatable balance equipment of claim 1, wherein neither of the two handles extend beyond a plane of the non-indented portions of the sides they are in.

4. The inflatable balance equipment of claim 1, further comprising a connecting device operable to connect one handle to another similar handle on a second inflatable pad to interlock two inflatable pads together using one handle from each inflatable pad to form an array of inflatable pads.

5. The inflatable balance equipment of claim 4, wherein the connecting device is configured to fill adjacent indentations in adjacent inflatable pads.

6. The inflatable balance equipment of claim 4, wherein the connecting device defines a top surface that is configured to be substantially flush with top surfaces on adjacent inflatable pads when the connecting device is connecting adjacent inflatable pads together in an array of inflatable pads.

7. The inflatable balance equipment of claim 1, further comprising:
two additional indentations in two other opposite sides, with each additional indentation spanning the width of the side it is in; and
two additional handles unitarily formed out of the same material as the inflatable pad with one handle positioned in each of the additional indentations.

8. The inflatable balance equipment of claim 1, wherein the inflatable pad further comprises:
a first balance surface adjacent the two opposite sides, wherein the first balance, surface is one of the two largest surfaces on the pad;
a first indicia on the first balance surface extending along either a longitudinal axis of the inflatable pad or a horizontal axis of the inflatable pad, wherein the first balance surface is substantially symmetrical about the first indicia and wherein a trainer can use the first indicia to aid in positioning the paws of a dog.

9. The inflatable balance equipment of claim 8, further comprising one or more protrusions that extend away from the first balance surface and which define the first indicia.

10. The inflatable balance equipment of claim 8, further comprising a second indicia on the first balance surface extending perpendicular to the first indicia along either the longitudinal axis of the inflatable pad or the horizontal axis of the inflatable pad, wherein the first balance surface is substantially symmetrical about the second indicia and wherein a trainer can use the second indicia to aid in positioning the paws of a dog.

11. The inflatable balance equipment of claim 1, wherein the inflatable pad further comprises:
a first balance surface, wherein the first balance surface is one of the two largest surfaces on the inflatable pad; and
a first array of raised members on the first balance surface adapted to aid in providing traction to a dog standing on the first balance surface.

12. The inflatable balance equipment of claim 11, wherein the inflatable pad further comprises:

a second balance surface opposite the first balance surface; and a second array of raised members on the second balance surface adapted to aid in providing traction to a dog standing on the first balance surface, wherein the second array is different than the first array.

13. The inflatable balance equipment of claim 1, wherein the inflatable pad defines a selectively sealable internal chamber adapted to contain a volume of fluid, wherein the inflatable pad is adapted to be selectively inflated or deflated at different volumes comprising under inflated, fully inflated and over inflated, wherein, when under inflated and when not otherwise deformed, a top surface of the inflatable pad defines a concave shape, wherein, when fully inflated and when not otherwise deformed, the top surface of the inflatable pad is substantially planar, wherein, when over inflated and not otherwise deformed, the top surface defines a convex shape, and wherein the inflatable pad is constructed of a resilient material that deforms under the weight of a dog encouraging the dog to balance weight distribution between multiple paws to be balanced on the inflatable pad.

14. The inflatable balance equipment of claim 1, wherein the inflatable pad is at least 60 cm long and is at least 10 cm thick and wherein a thickness of the handles is substantially less than a thickness of the inflatable pad.

15. The inflatable balance equipment of claim 1, wherein a thickness of the handles is substantially less than a thickness of the inflatable pad.

16. The inflatable balance equipment of claim 1, wherein the inflatable pad further comprises:
a balance surface, wherein the balance surface is one of the two largest surfaces on the inflatable pad; and
a contiguous side wall that extends completely around a periphery of the balance surface, wherein the contiguous side wall defines each of the two indentations, and wherein the contiguous side wall is substantially perpendicular to the balance surface.

17. The inflatable balance equipment of claim 16, wherein the contiguous side wall curves inwardly at each of the two indentations such that the contiguous side wall at the indentions on the opposing sides defines curved shapes and wherein the distance between the side walls in each of the two opposite sides is variable along a length of the indentions.

18. Inflatable balance equipment adapted for use in training dogs, the balance equipment comprising:
an inflatable pad in the general shape of a right rectangular prism having rounded edges, the inflatable pad comprising;
a first balance surface, wherein the first balance surface is one of the two largest surfaces on the right rectangular prism;
one or more first protrusions that extend away from the first balance surface which define a first indicia on the first balance surface extending along either a longitudinal axis of the inflatable pad or a horizontal axis of the inflatable pad, wherein the first balance surface is substantially symmetrical about the first indicia and wherein a trainer can use the first indicia to aid in positioning the paws of a dog; and
one or more second protrusions that extend away from the first balance surface which define a second indicia on the first balance surface extending perpendicular to the first indicia along either the longitudinal axis of the inflatable pad or the horizontal axis of the inflatable pad, wherein the first balance surface is substantially symmetrical about the second indicia and wherein a trainer can use the second indicia to add in positioning the paws of a dog.

19. Inflatable balance equipment adapted for use in training dogs, the balance equipment comprising:
an inflatable pad in the general shape of a right rectangular prism having rounded edges and with an indentation in each of four sides with each indentation spanning an entire height of the side it is in, the inflatable pad comprising: four handles unitarily formed out of the same material as the inflatable pad with one handle positioned in each of the indentations;
a first balance surface, wherein the first balance surface is one of the two largest surfaces on the inflatable pad;
a contiguous side wall that extends completely around a periphery of the first balance surface, wherein the contiguous side wall defines each of the four indentations, and wherein the contiguous side wall is substantially perpendicular to the first balance surface; and
a connecting device operable to connect one handle to another similar handle on a second inflatable pad to interlock two inflatable pads together using one handle from each inflatable pad to form an array of inflatable pads.

20. The inflatable balance equipment of claim 19, wherein the inflatable pad further comprises:
a first indicia on the first balance surface extending along a longitudinal axis of the inflatable pad, wherein the first balance surface is substantially symmetrical about the first indicia and wherein a trainer can use the first indicia to aid in positioning the paws of a dog; and
a second indicia on the first balance surface extending along a horizontal axis of the inflatable pad, wherein the first balance surface is substantially symmetrical about the second indicia and wherein a trainer can use the second indicia to add in positioning the paws of a dog.

21. The inflatable balance equipment of claim 20, wherein the inflatable pad further comprises:
a first array of raised members on the first balance surface adapted to aid in providing traction to a dog standing on the first balance surface.

22. The inflatable balance equipment of claim 21, wherein the inflatable pad further comprises:
a second balance surface opposite the first balance surface; and
a second array of raised members on the second balance surface adapted to aid in providing traction to a dog standing on the first balance surface, wherein the second array is different than the first array.

* * * * *